UNITED STATES PATENT OFFICE.

JAMES HENDERSON, OF BELLEFONTE, PENNSYLVANIA.

COMPOUND FOR FURNACE-LININGS AND FIRE-BRICK.

SPECIFICATION forming part of Letters Patent No. 279,160, dated June 12, 1883.

Application filed October 24, 1882. (No specimens.)

*To all whom it may concern:*

Be it known that I, JAMES HENDERSON, of Bellefonte, county of Centre, State of Pennsylvania, have invented a new and useful Improvement in Compounds for Furnace-Linings and Fire-Brick, of which the following is such full, clear, and exact description as will enable others skilled in the art to which it most nearly appertains to make and use the same.

The object of this invention is to make a compound for furnace-linings, fire-brick, or tuyeres for furnaces, converters, and other metallurgic vessels, of lime, magnesian lime, or magnesia with fluor-spar, which will be refractory and not appreciably expanded or contracted by a change of temperature; and it consists of the compound and modifications thereto hereinafter claimed.

In carrying out this my invention I take hydrated lime, magnesian lime, or magnesia, free or nearly free from impurities, such as silica, alumina, or oxide of iron, (a small amount of fluor-spar will not injure the compound,) and mix it with water to a thick mortar, and form this into blocks, which are dried at the ordinary temperature, and afterward subjected, in any suitable furnace or kiln, to a high temperature, so as to frit or harden the block. Such furnace may be an open-hearth steel-melting furnace, in which the blocks should be exposed from three to six hours, which causes the lime or magnesian lime or magnesia, prepared as above described, to frit and to become very hard and firm. The blocks so treated, as above described, are then ground or pulverized sufficiently fine to pass through a sieve of about three thousand six hundred meshes to the square inch. When lime is used it is better to mix with the water with which it is compounded a proportion of glucose or other binding agent, to hold the mass together. To this fritted and pulverized lime, magnesian lime, or magnesia, is added pulverized fluor-spar, preferably in the proportion of ninety-two (92) to ninety-eight (98) per cent. of the fritted and pulverized mass to from eight (8) to two (2) per cent. of the pulverized fluor-spar, by weight. Instead of fluor-spar may be added a mixture of fluor-spar and lime, magnesian lime, or magnesia, in about equal parts, and this mixture of pulverized fritted mass and fluor-spar, either with or without lime, magnesian lime, or magnesia, is mixed together and water added in sufficient quantity to make the whole into a thick mortar.

This compound may be applied wet as a lining to furnaces, converters, or other metallurgic vessels, or may be molded into brick and dried, when it is ready for use, or it may be burned after being dried.

Instead of using water alone to moisten the mixture into a mortar, I use water and glucose in the proportion of one and a half parts water to one part glucose, or more water may be used. The better results are obtained when the liquor is as strong a binding agent as possible.

Instead of glucose, dextrine, starch, mucilage, gum-arabic, molasses, or like vegetable substances, from which starch or sugar may be derived, may be dissolved in the water; or rice, rye, wheat, or other grain flour, pea, bean, or oat meal, cellulose, wood pulp, or other like vegetable substance from which starch or sugar may be derived, may be added in a finely-divided state and mixed with it into a thin paste, or so that the finely-divided substance is in suspension in the water, and this is used to moisten the before-described mixture into a thick mortar. The water containing glucose, or a vegetable substance from which starch or sugar can be derived, forms a strong binding agent to the mortar, and makes possible that it be handled with greater ease before thoroughly dry, and makes a harder lining or brick than when water without a vegetable substance from which starch or sugar can be derived is used.

I do not wish to limit myself in this invention to the exact proportions here given, as good results can be obtained with greater or less proportions; but those herein given afford the best results.

What I claim as new, and desire to secure by Letters Patent, is—

1. The refractory compound for furnace-linings and fire-brick, consisting of fritted and pulverized lime, or its herein-named equivalent, with (unfritted and) pulverized fluor-spar and water, as specified and set forth.

2. The refractory compound for furnace-linings and fire-brick, consisting of fritted and pulverized lime, or its herein-named equivalent, with (unfritted and) pulverized fluor-spar, lime, or its herein-named equivalent, and water, as specified.

3. The refractory compound for furnace-linings and fire-brick, consisting of fritted and pulverized lime, or its herein-named equivalent, with (unfritted and) pulverized fluor-spar and water, and a vegetable substance from which starch or sugar can be derived, as specified.

4. The refractory compound for furnace-linings and fire-brick, consisting of fritted and pulverized lime, or its herein-named equivalent, with (unfritted and) pulverized fluor-spar and water and glucose, as specified.

JAMES HENDERSON.

Witnesses:
WILBUR F. REEDER,
D. H. HASTINGS.